US011650444B2

(12) United States Patent  
Koito

(10) Patent No.: US 11,650,444 B2  
(45) Date of Patent: May 16, 2023

(54) DISPLAY DEVICE AND ELECTRONIC APPARATUS INCORPORATING DISPLAY DEVICE THEREIN

(71) Applicant: Japan Display Inc., Tokyo (JP)

(72) Inventor: Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/443,120

(22) Filed: Jul. 21, 2021

(65) Prior Publication Data

US 2021/0349344 A1  Nov. 11, 2021

Related U.S. Application Data

(63) Continuation of application No. PCT/JP2019/045467, filed on Nov. 20, 2019.

(30) Foreign Application Priority Data

Jan. 22, 2019 (JP) .............................. JP2019-008296

(51) Int. Cl.
 *G02F 1/1333* (2006.01)
 *G02F 1/1335* (2006.01)
 *G02F 1/1343* (2006.01)

(52) U.S. Cl.
 CPC .... *G02F 1/133345* (2013.01); *G02F 1/13439* (2013.01); *G02F 1/133512* (2013.01);
 (Continued)

(58) Field of Classification Search
 None
 See application file for complete search history.

(56) References Cited

U.S. PATENT DOCUMENTS

2013/0063676 A1  3/2013  Tsuchihashi et al.
2014/0104543 A1*  4/2014  Li ............................. G02F 1/29
    349/84
(Continued)

FOREIGN PATENT DOCUMENTS

CN       102914921 A     2/2013
JP      2007-086221 A    4/2007
(Continued)

OTHER PUBLICATIONS

International Search Report dated Feb. 10, 2020 in PCT/JP2019/045467 filed on Nov. 20, 2019, 2 pages.
(Continued)

*Primary Examiner* — Ryan Crockett
(74) *Attorney, Agent, or Firm* — Maier & Maier, PLLC

(57) ABSTRACT

According to one embodiment, a display device and an electronic apparatus each include a liquid crystal layer, a first insulating substrate, a pixel electrode, a first transparent electrode disposed between the first insulating substrate and the liquid crystal layer, a second insulating substrate, a first organic insulating film overlapping the pixel electrode, a second organic insulating film disposed between the first organic insulating film and the liquid crystal layer, and a second transparent electrode overlapping the first transparent electrode and disposed between the second insulating substrate and the liquid crystal layer. The first organic insulating film includes a concave portion, and the second transparent electrode is disposed in the concave portion.

18 Claims, 13 Drawing Sheets

(52) U.S. Cl.
CPC .. *G02F 1/133514* (2013.01); *G02F 1/133371* (2013.01); *G02F 1/133388* (2021.01)

(56) References Cited

U.S. PATENT DOCUMENTS

| | | | |
|---|---|---|---|
| 2016/0161798 A1* | 6/2016 | Lee | G02B 5/3058 |
| | | | 349/96 |
| 2016/0223863 A1* | 8/2016 | Mizunuma | G02F 1/133617 |
| 2017/0053592 A1 | 2/2017 | Shin et al. | |
| 2019/0258105 A1* | 8/2019 | Hara | G06F 3/041 |
| 2020/0286436 A1* | 9/2020 | Lim | G01J 1/02 |
| 2021/0141252 A1* | 5/2021 | Takimoto | G02B 6/0055 |
| 2021/0223619 A1* | 7/2021 | Zhou | G02F 1/13312 |
| 2021/0318573 A1* | 10/2021 | Koito | G02B 6/0081 |
| 2021/0405407 A1* | 12/2021 | Sun | G02F 1/133331 |
| 2021/0407440 A1* | 12/2021 | Liu | G02F 1/133603 |

FOREIGN PATENT DOCUMENTS

| | | |
|---|---|---|
| JP | 2014-197203 A | 10/2014 |
| JP | 2016-142845 A | 8/2016 |
| JP | 2017-040908 A | 2/2017 |

OTHER PUBLICATIONS

Chinese Office Action dated Aug. 17, 2022 in corresponding Chinese Application No. 201980089404.3; 13 pages.

Office Action dated Dec. 6, 2022, in corresponding Japanese Application No. 2019-008296, 8 pages.

Office Action dated Feb. 16, 2023, in corresponding Chinese Application No. 201980089404.3, 6 pages.

* cited by examiner

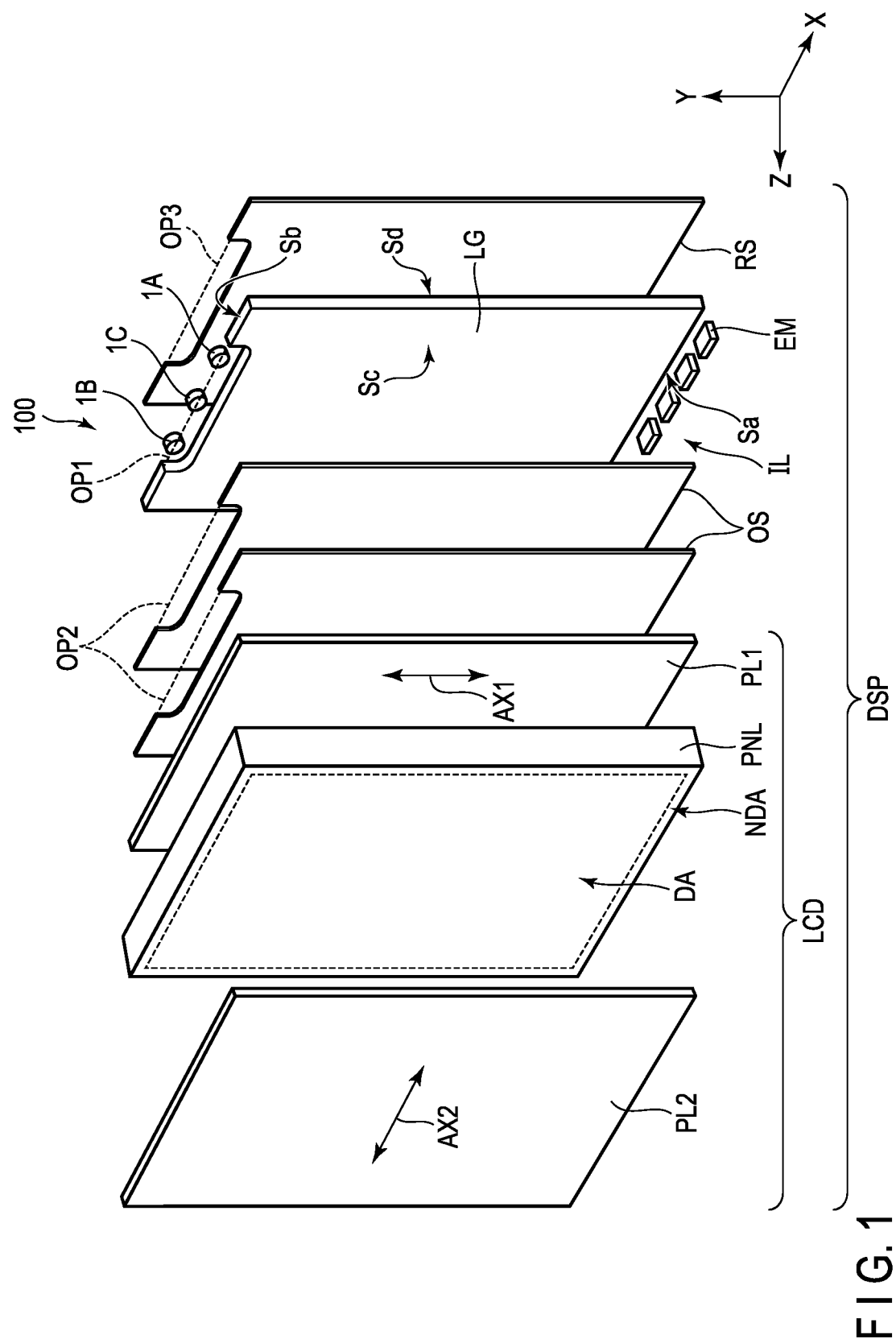
F I G. 1

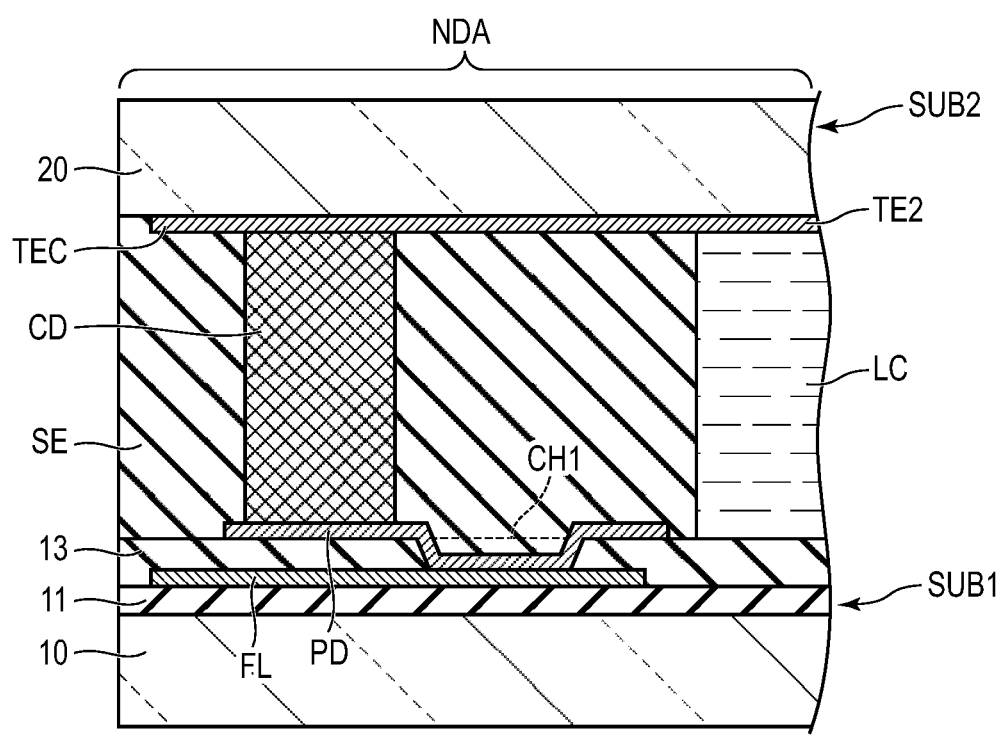
F I G. 5

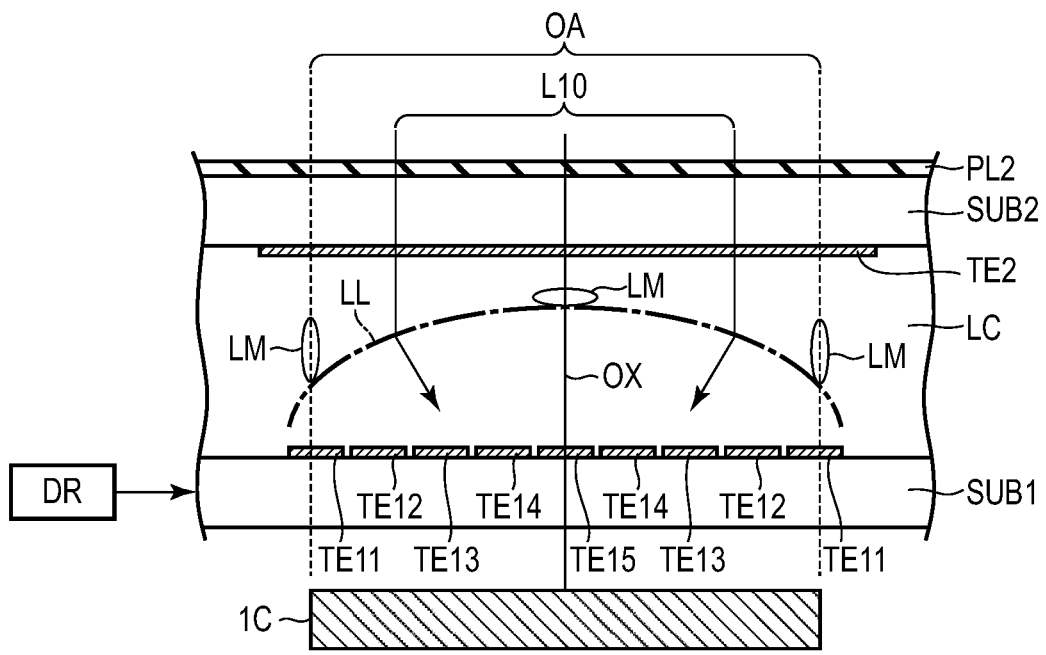
F I G. 7
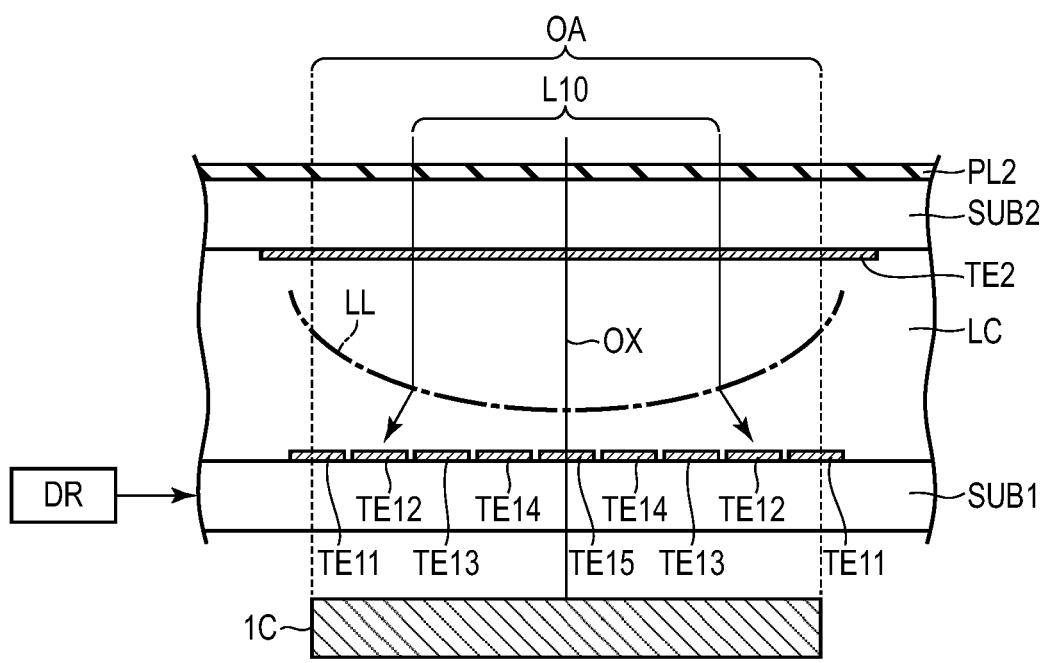
F I G. 8

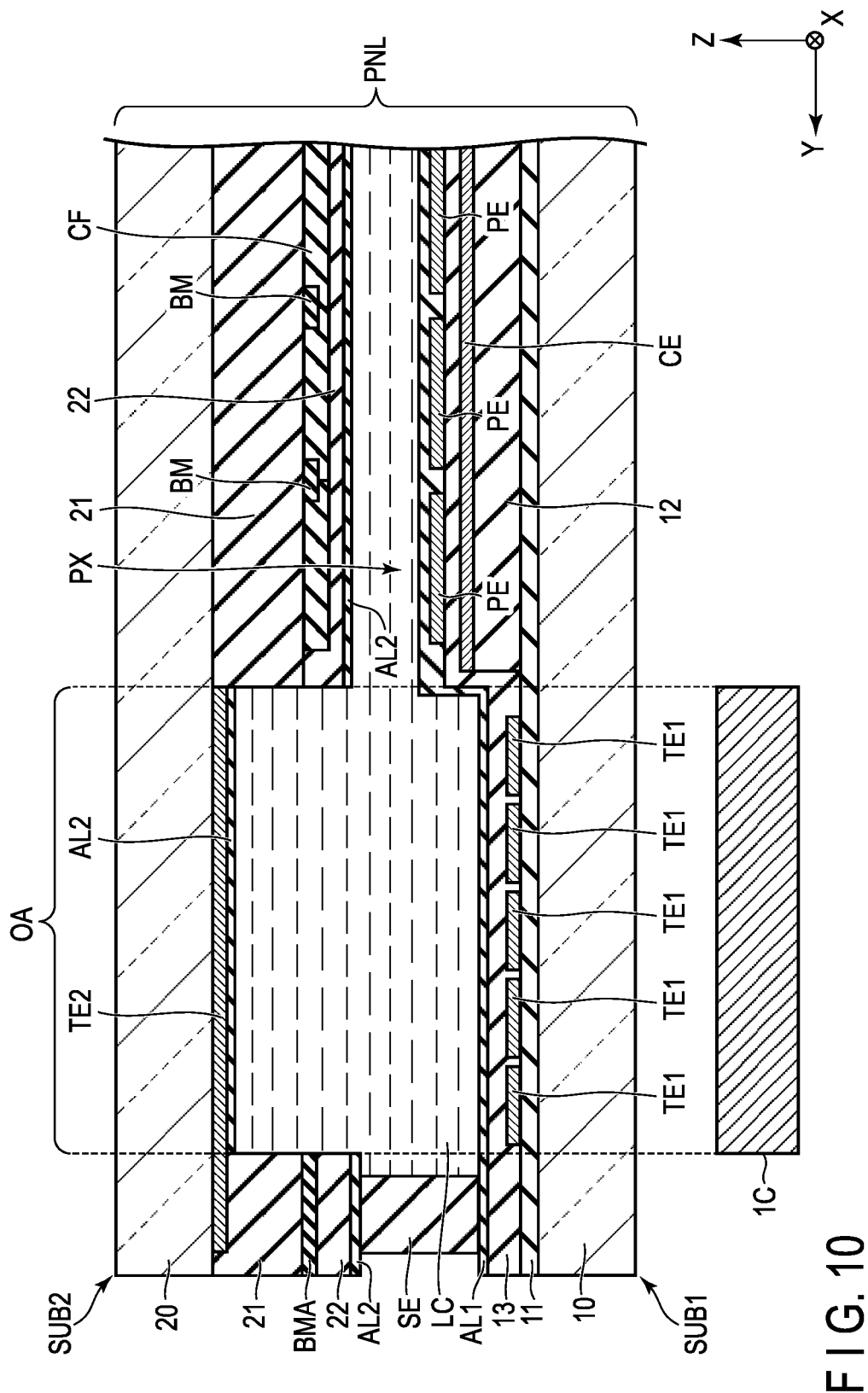
F I G. 10

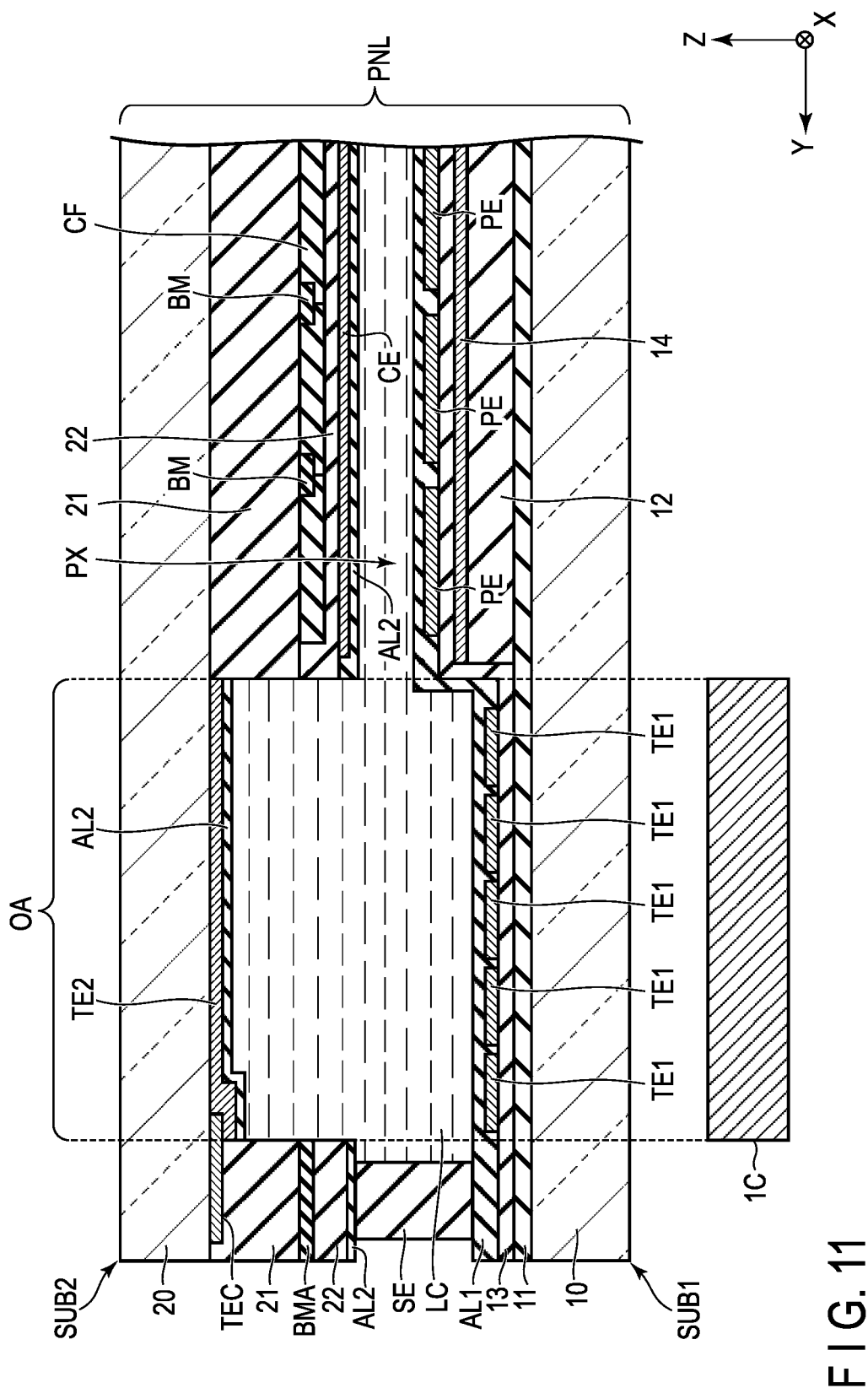
F I G. 11

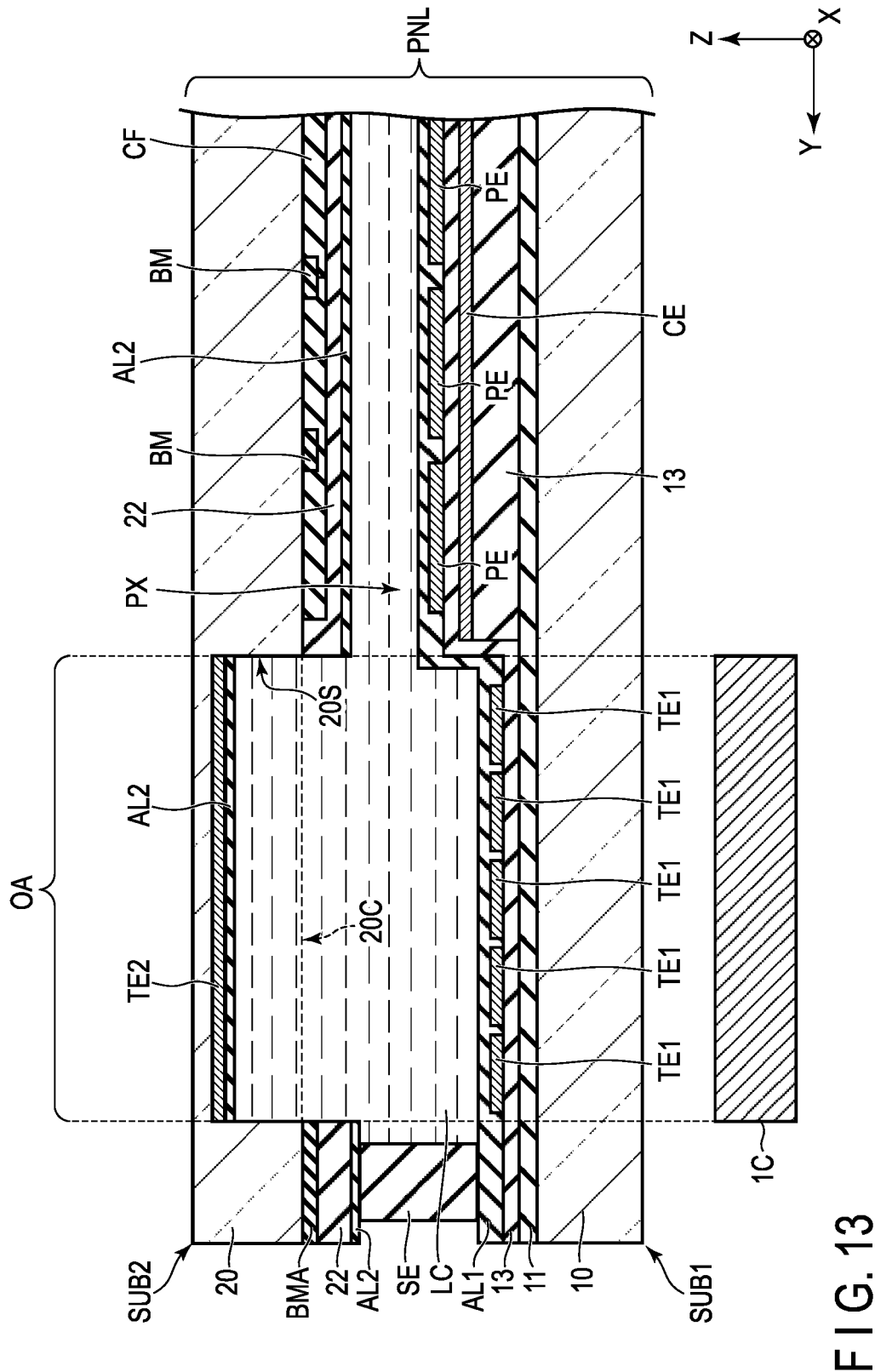
F I G. 13

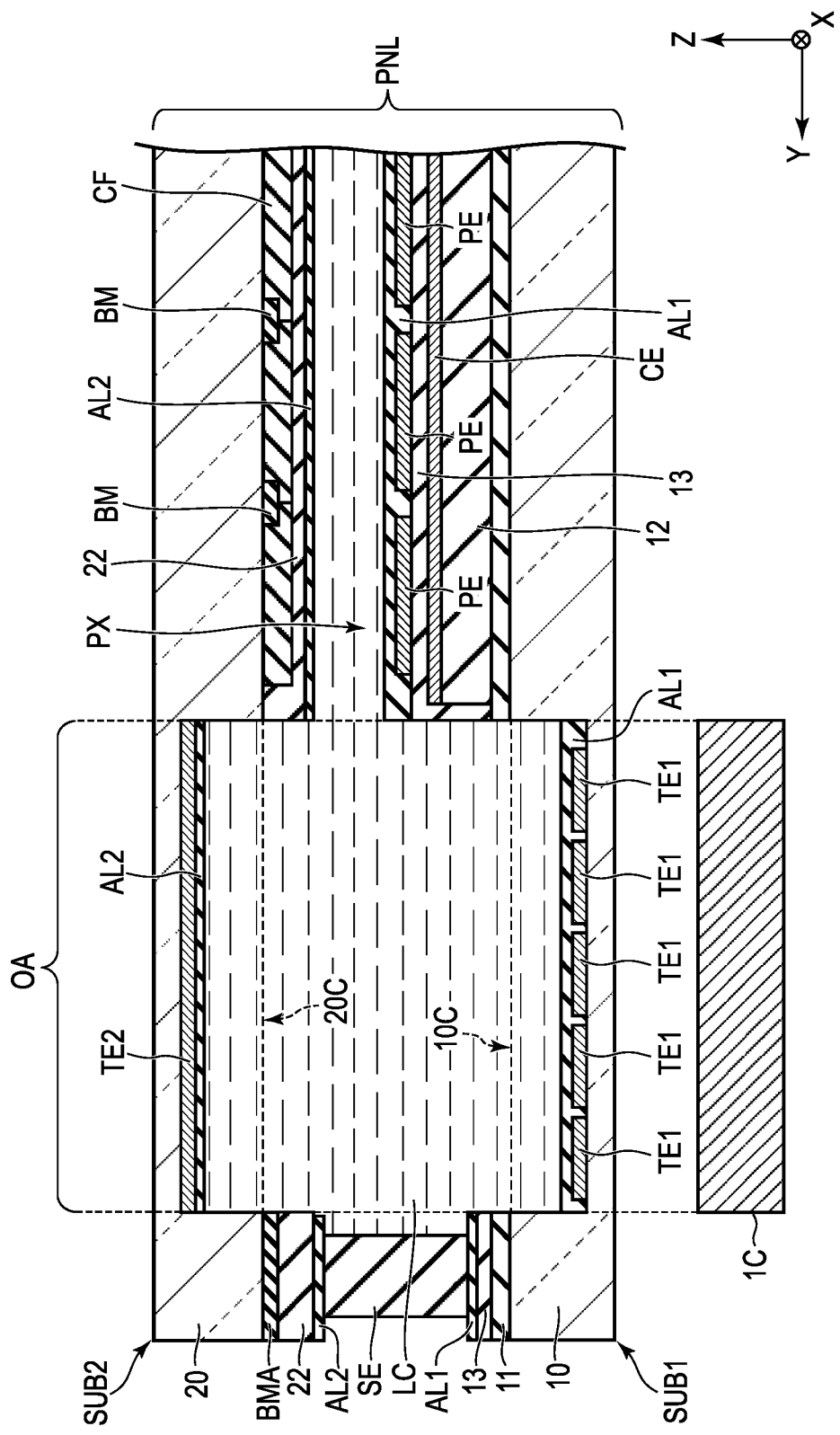
F I G. 14

DISPLAY DEVICE AND ELECTRONIC APPARATUS INCORPORATING DISPLAY DEVICE THEREIN

CROSS-REFERENCE TO RELATED APPLICATIONS

This application is a Continuation Application of PCT Application No. PCT/JP2019/045467, filed Nov. 20, 2019 and based upon and claiming the benefit of priority from Japanese Patent Application No. 2019-008296, filed Jan. 22, 2019, the entire contents of all of which are incorporated herein by reference.

FIELD

Embodiments described herein relate generally to a display device and an electronic apparatus incorporating the display device therein.

BACKGROUND

Recently, electronic apparatuses such as smartphones comprising a display part and a camera on the same surface side have been widely put into practical use. In this electronic apparatus, the camera is disposed outside the display part, and there has been an increasing demand to expand the display part while securing a space for installing the camera and the like.

Meanwhile, a technique of disposing a liquid crystal diaphragm part in front of an imaging element has been proposed.

BRIEF DESCRIPTION OF THE DRAWINGS

FIG. 1 is an exploded perspective view showing a configuration example of a display device DSP according to the present embodiment.

FIG. 5 is a cross-sectional view showing a feeding structure for applying voltage to a second transparent electrode TE2.

FIG. 7 is an illustration for explaining a control example for forming a lens LL in a liquid crystal layer LC of the optical function area OA.

FIG. 8 is an illustration for explaining another control example for forming the lens LL in the liquid crystal layer LC of the optical function area OA.

FIG. 10 is a cross-sectional view showing the second configuration example of the liquid crystal element LCD including the optical function area OA and the pixel PX.

FIG. 11 is a cross-sectional view showing the third configuration example of the liquid crystal element LCD including the optical function area OA and the pixel PX.

FIG. 13 is a cross-sectional view showing the fifth configuration example of the liquid crystal element LCD including the optical function area OA and the pixel PX.

FIG. 14 is a cross-sectional view showing the sixth configuration example of the liquid crystal element LCD including the optical function area OA and the pixel PX.

DETAILED DESCRIPTION

Figure 2:
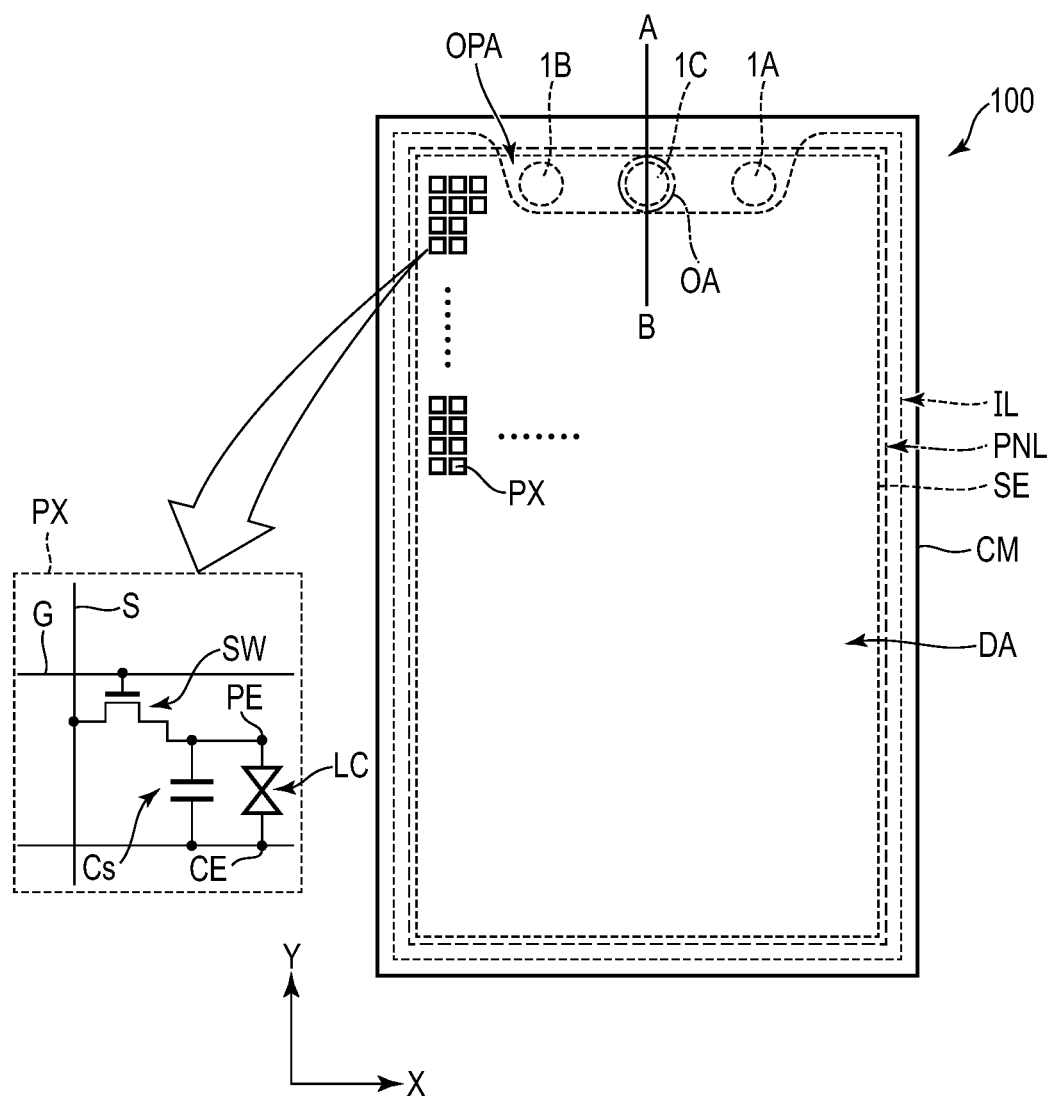
FIG. 2 is a plan view showing a configuration example of an electronic apparatus 100.

In general, according to one embodiment, there is provided a display device comprising: a liquid crystal layer; a first substrate comprising a first insulating substrate, a pixel electrode disposed between the first insulating substrate and the liquid crystal layer, and a first transparent electrode disposed between the first insulating substrate and the liquid crystal layer; and a second substrate comprising a second insulating substrate, a first organic insulating film overlapping the pixel electrode and disposed between the second insulating substrate and the liquid crystal layer, a second organic insulating film disposed between the first organic insulating film and the liquid crystal layer, and a second transparent electrode overlapping the first transparent electrode and disposed between the second insulating substrate and the liquid crystal layer. The first organic insulating film comprises a concave portion. The second transparent electrode is disposed in the concave portion.

According to another embodiment, there is provided a display device comprising: a liquid crystal layer; a first substrate comprising a first insulating substrate, a pixel electrode disposed between the first insulating substrate and the liquid crystal layer, and a first transparent electrode disposed between the first insulating substrate and the liquid crystal layer; and a second substrate comprising a second insulating substrate, and a second transparent electrode overlapping the first transparent electrode and disposed between the second insulating substrate and the liquid crystal layer. At least one of an area of the first insulating substrate in which the first transparent electrode is disposed and an area of the second insulating substrate in which the second transparent electrode is disposed comprises a concave portion.

According to yet another embodiment, there is provided an electronic apparatus comprising: a liquid crystal panel comprising a liquid crystal layer; and a camera overlapping the liquid crystal panel, and receiving light via the liquid crystal panel. The liquid crystal panel comprises: a first substrate comprising a first insulating substrate, a pixel electrode disposed between the first insulating substrate and the liquid crystal layer, and a first transparent electrode overlapping the camera and disposed between the first insulating substrate and the liquid crystal layer; and a second substrate comprising a second insulating substrate, a first organic insulating film overlapping the pixel electrode and disposed between the second insulating substrate and the liquid crystal layer, a second organic insulating film disposed between the first organic insulating film and the liquid crystal layer, and a second transparent electrode overlapping the first transparent electrode and disposed between the second insulating substrate and the liquid crystal layer. The first organic insulating film comprises a concave portion. The second transparent electrode is disposed in the concave portion.

According to yet another embodiment, there is provided a display device comprising: a first substrate comprising a first insulating substrate, and a pixel electrode and a first transparent electrode disposed on the first insulating substrate; a second substrate comprising a second insulating substrate, a first organic insulating film overlapping the pixel electrode and disposed on the second insulating substrate, a second organic insulating film disposed on the first organic insulating film, and a second transparent electrode disposed on a part of the second insulating substrate on which the first organic insulating film and the second organic insulating film are not disposed and which overlaps the first transparent electrode; and a liquid crystal layer disposed between the first substrate and the second substrate. A liquid crystal lens is formed by the liquid crystal layer between the first transparent electrode and the second transparent electrode.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, constituent elements which function in the same or a similar manner to those described in connection with preceding drawings are denoted by the same reference numbers, and detailed descriptions thereof which are considered redundant are omitted unless necessary.

FIG. 1 is an exploded perspective view showing a configuration example of a display device DSP according to the present embodiment. In one example, a first direction X, a second direction Y and a third direction Z are orthogonal to one another. However, these directions may intersect at an angle other than 90 degrees. The first direction X and the second direction Y correspond to directions parallel to the main surface of a substrate constituting the display device DSP, and the third direction Z corresponds to the thickness direction of the display device DSP.

The display device DSP comprises a first polarizer PL1 and a second polarizer PL2, a liquid crystal panel PNL, optical sheets OS, a light guide LG, light sources EM and a reflective sheet RS. The reflective sheet RS, the light guide LG, the optical sheets OS, the first polarizer PL1, the liquid crystal panel PNL and the second polarizer PL2 are arranged in this order along the third direction Z. The light sources EM are arranged at intervals along the first direction X. The first polarizer PL1, the second polarizer PL2 and the liquid crystal panel PNL constitute a liquid crystal element LCD comprising an optical switch function for light traveling along the third direction Z. This liquid crystal element LCD performs a function of transmitting light or blocking light for each area in an X-Y plane defined by the first direction X and the second direction Y.

The liquid crystal panel PNL is formed in, for example, a flat plate shape parallel to the X-Y plane. The liquid crystal panel PNL is disposed between the first polarizer PL1 and the second polarizer PL2. The liquid crystal panel PNL comprises a display portion DA for displaying an image, and a frame-shaped non-display portion NDA surrounding the display portion DA. The display portion DA is a substantially rectangular area which does not include any notch, and four corners thereof may be rounded. The description of the detailed configuration of the liquid crystal panel PNL is omitted here, but the liquid crystal panel PNL may comprise a configuration corresponding to any of a display mode using a lateral electric field along the main surface of a substrate, a display mode using a longitudinal electric field along the normal to the main surface of a substrate, a display mode using an inclined electric field inclined in an oblique direction with respect to the main surface of a substrate, and a display mode using an arbitrary combination of the lateral electric field, the longitudinal electric field and the inclined electric field described above. The main surface of the substrate here is a surface parallel to the X-Y plane.

The first polarizer PL1 and the second polarizer PL2 overlap at least the display portion DA with respect to the liquid crystal panel PNL. In one example, an absorption axis AX1 of the first polarizer PL1 and an absorption axis AX2 of the second polarizer PL2 are orthogonal to each other in the X-Y plane.

An illumination device IL illuminates the liquid crystal panel PNL from the back surface side. The illumination device IL is composed of, for example, the light sources EM, the light guide LG, the optical sheets OS and the reflective sheet RS.

The light guide LG has a side surface Sa opposed to the light sources EM, a side surface Sb on the opposite side to the side surface Sa, a main surface Sc opposed to the liquid crystal panel PNL, a main surface Sd on the opposite side to the main surface Sc, and a first opening OP1. The first opening OP1 is provided on the opposite side to the side surface Sa. However, the first opening OP1 is not particularly limited, but may be provided in a side surface orthogonal to the side surface Sa. In the illustrated example, the first opening OP1 corresponds to a concave portion or a notch which is recessed from the side surface Sb toward the side surface Sa. It should be noted that the first opening OP1 may be a through hole penetrating the light guide LG in the third direction Z.

The optical sheets OS are disposed between the light guide LG and the liquid crystal panel PNL, and are opposed to the main surface Sc. The optical sheets OS each have a second opening OP2 overlapping the first opening OP1. The optical sheets OS each are, for example, a prism sheet or a diffusion sheet.

The reflective sheet RS is opposed to the main surface Sd. That is, the light guide LG is disposed between the reflective sheet RS and the optical sheets OS. The reflective sheet RS has a third opening OP3 overlapping the first opening OP1. The third opening OP3, the first opening OP1 and the second openings OP2 are arranged in this order along the third direction Z, and are disposed on the same straight line. The reflective sheet RS may be fixed to a frame, for example. In that case, an opening overlapping the first opening OP1 may also be formed in the frame.

The light sources EM each are, for example, a light-emitting diode (LED), and each emit white illumination light. The illumination light emitted from the light sources EM enters from the side surface Sa, and travels inside the light guide LG. Then, the illumination light guided by the light guide LG emerges from the main surface Sc toward the liquid crystal panel PNL, and illuminates the liquid crystal panel PNL. The liquid crystal panel PNL, the first polarizer PL1 and the second polarizer PL2 selectively transmit the illumination light and thereby display an image in the display portion DA.

An electronic apparatus 100 incorporating the display device DSP therein comprises a projection element 1A, a detection element 1B, a camera 1C for visible light, and the like. For example, the detection element 1B, the camera 1C and the projection element 1A are arranged in this order at intervals along the first direction X, and are disposed overlapping the first to third openings OP1 to OP3 in the third direction Z. The liquid crystal panel PNL, the first polarizer PL1 and the second polarizer PL2 overlap the first to third openings OP1 to OP3 in the third direction Z, and also overlap the projection element 1A, the detection element 1B and the camera 1C. In addition, the projection element 1A, the detection element 1B and the camera 1C overlap the display portion DA of the liquid crystal panel PNL in the third direction Z.

The projection element 1A projects infrared light toward the liquid crystal panel PNL, the first polarizer PL1 and the second polarizer PL2. The projection element 1A projects infrared light having a peak wavelength in a range of, for example, 900 nm to 1000 nm. The infrared light emitted from the projection element 1A via the liquid crystal element LCD forms a pattern of dots distributed in the X-Y plane, and is projected toward an object to be detected.

The detection element 1B detects the infrared light transmitted via the liquid crystal panel PNL, the first polarizer PL1 and the second polarizer PL2 (that is, the infrared light dot pattern reflected from the object to be detected). The detection result by the detection element 1B can be used for, for example, authentication of the object to be detected or the like.

The camera 1C comprises an image sensor (imaging element) which receives light via the liquid crystal panel PNL, the first polarizer PL1 and the second polarizer PL2. This camera 1C receives visible light (light in a range of, for example, 400 nm to 700 nm) transmitted via the liquid crystal panel PNL, the first polarizer PL1 and the second polarizer PL2. When the absorption axis AX1 of the first polarizer PL1 and the absorption axis AX2 of the second polarizer PL2 are orthogonal to each other, and when the wavelength of light transmitted through a liquid crystal layer LC of the liquid crystal element LCD is $\lambda$ and the retardation of the liquid crystal layer LC corresponds to almost zero or $\lambda$, the transmittance of the liquid crystal element LCD is minimized. Therefore, during the image capturing by the camera 1C, the retardation of the liquid crystal layer LC is set to greater than zero but less than $\lambda$. When the retardation is about $\lambda/2$, the transmittance of the liquid crystal element LCD is maximized.

FIG. 2 is a plan view showing a configuration example of the electronic apparatus 100. The illumination device IL has an opening OPA. The first to third openings OP1 to OP3 shown in FIG. 1 are formed corresponding to the opening OPA. The projection element 1A, the detection element 1B and the camera 1C are disposed in the opening OPA.

The liquid crystal panel PNL comprises pixels PX arranged in a matrix in the first direction X and the second direction Y in the display portion DA. Each pixel PX has the same circuit configuration. As shown enlarged in FIG. 2, each pixel PX comprises a switching element SW, a pixel electrode PE, a common electrode CE, the liquid crystal layer LC and the like. The switching element SW is constituted by, for example, a thin-film transistor (TFT), and is electrically connected to the scanning line G and the signal line S. The pixel electrode PE is electrically connected to the switching element SW. Each pixel electrode PE is opposed to the common electrode CE. The liquid crystal layer LC is driven by an electric field generated between the pixel electrode PE and the common electrode CE. A capacitance Cs is formed, for example, between an electrode having the same potential as the common electrode CE and an electrode having the same potential as the pixel electrode PE.

The liquid crystal panel PNL overlaps the illumination device IL. In addition, the liquid crystal panel PNL overlaps the projection element 1A, the detection element 1B and the camera 1C. In planar view, the projection element 1A, the detection element 1B and the camera 1C are disposed on the inside surrounded by a sealant SE of the liquid crystal panel PNL. The liquid crystal panel PNL comprises an optical function area OA overlapping the camera 1C. The optical function area OA will be described later in detail, but the optical function area OA has a different configuration from the pixel PX. In the liquid crystal panel PNL, an area overlapping the projection element 1A and the detection element 1B may have the same configuration as the pixel PX, may have the same configuration as the optical function area OA, or may have a different configuration from both the pixel PX and the optical function area OA.

A cover member CM is transparent, and is a glass substrate or a resin substrate. The cover member CM overlaps the liquid crystal panel PNL.

Figure 3:
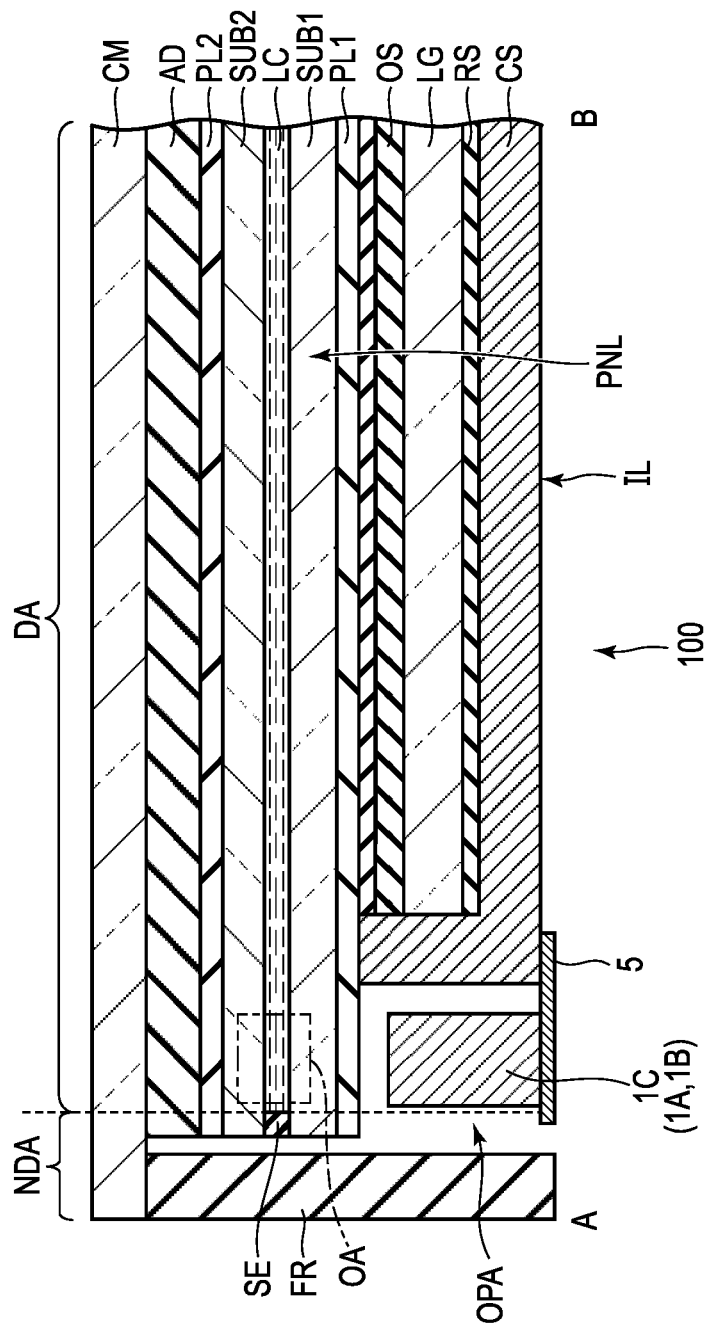
FIG. 3 is a cross-sectional view along line A-B including a camera 1C of the electronic apparatus 100 shown in FIG. 2.

FIG. 3 is a cross-sectional view along line A-B including the camera 1C of the electronic apparatus 100 shown in FIG. 2. The liquid crystal panel PNL comprises a first substrate SUB1, a second substrate SUB2, the liquid crystal layer LC, and the sealant SE. The liquid crystal layer LC is disposed between the first substrate SUB1 and the second substrate SUB2. The sealant SE is located in the non-display portion NDA, and bonds the first substrate SUB1 and the second substrate SUB2 together and seals in the liquid crystal layer LC. The optical function area OA will be described later.

The first polarizer PL1 is bonded to the first substrate SUB1. The second polarizer PL2 is bonded to the second substrate SUB2. The first polarizer PL1 and the second polarizer PL2 are arranged over the display portion DA and the non-display portion NDA. The first polarizer PL1 and the second polarizer PL2 may comprise a retarder, a scattering layer, an antireflective layer and the like as needed.

In the illumination device IL, the optical sheets OS, the light guide LG and the reflective sheet RS, and the unillustrated light sources EM are accommodated in a case CS. This illumination device IL is bonded to the first polarizer PL1 by an unillustrated double-faced tape or the like.

The cover member CM is bonded to the second polarizer PL2 by a transparent adhesive resin AD. The cover member CM is fixed to a frame FR of the electronic apparatus 100.

In the illustrated cross-sectional view, the opening OPA corresponds to a space between the frame FR and the case CS of the illumination device IL. This space is located below the liquid crystal panel PNL. The camera 1C is disposed between the frame FR and the case CS. The unillustrated projection element 1A and the unillustrated detection element 1B are also disposed between the frame FR and the case CS. The camera 1C is electrically connected to a wiring board 5. The projection element 1A and the detection element 1B may be electrically connected to the same wiring board 5 as the camera 1C or may be electrically connected to a wiring board different from the wiring board 5.

According to the present embodiment, the projection element 1A, the detection element 1B and the camera 1C overlap the liquid crystal panel PNL. In addition, according to the present embodiment, the projection element 1A, the detection element 1B and the camera 1C overlap the display portion DA of the liquid crystal panel PNL. Therefore, the display portion DA can be expanded.

Furthermore, there is no need to provide a space for installing the camera 1C and the like in the non-display portion NDA. Therefore, the frame width of the non-display portion NDA can be reduced as compared with when the camera 1C and the like overlap the non-display portion NDA.

Figure 4:
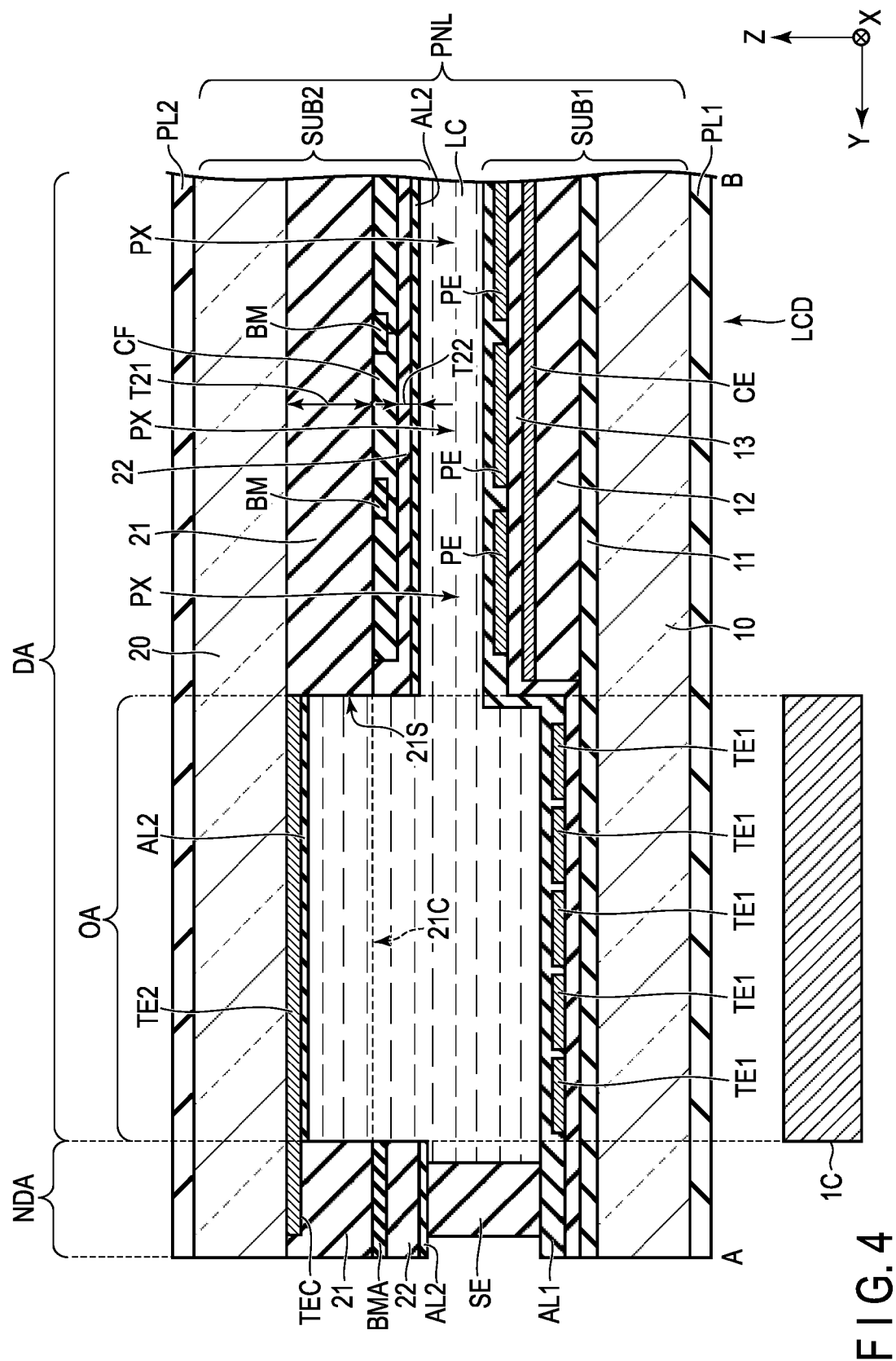
FIG. 4 is a cross-sectional view showing the first configuration example of a liquid crystal element LCD including an optical function area OA and a pixel PX.

FIG. 4 is a cross-sectional view showing the first configuration example of the liquid crystal element LCD including the optical function area OA and the pixel PX. The liquid crystal element LCD described here comprises the liquid crystal panel PNL corresponding to the display mode using the lateral electric field between the first polarizer PL1 and the second polarizer PL2. In the following description, a direction from the first substrate SUB1 toward the second substrate SUB2 is defined as above, and a direction from the second substrate SUB2 toward the first substrate SUB1 is defined as below.

The first substrate SUB1 comprises a first insulating substrate 10, insulating films 11 to 13, the common electrode CE, the pixel electrode PE, a first transparent electrode TE1 and an alignment film AL1. The scanning line, the signal line and the switching element shown in FIG. 2 are disposed, for example, between the first insulating substrate 10 and the common electrode CE. The pixel electrode PE and the first transparent electrode TE1 are disposed between the first insulating substrate 10 and the liquid crystal layer LC. The insulating film 12 is disposed between the first insulating substrate 10 and the pixel electrode PE, but is not disposed between the first insulating substrate 10 and the first transparent electrode TE1. The insulating film 13 is disposed between the pixel electrode PE and the common electrode CE. The structure of the first substrate SUB1 will be more specifically described below.

The first insulating substrate 10 is a transparent substrate such as a glass substrate or a flexible resin substrate. The insulating film 11 is disposed on the first insulating substrate 10. In each pixel PX, the insulating film 12 is disposed on the insulating film 11. The common electrode CE is disposed on the insulating film 12, and is covered with the insulating film 13. The pixel electrode PE is disposed on the insulating film 13, and is covered with the alignment film AL1. The pixel electrode PE overlaps the common electrode CE via the insulating film 13. The common electrode CE and the pixel electrode PE are formed of a transparent conductive material such as indium tin oxide (ITO) or indium zinc oxide (IZO). The pixel electrode PE comprises a strip electrode. The common electrode CE is a plate-shaped electrode disposed in common to the pixels PX. In the optical function area OA, the first transparent electrode TE1 is disposed on the insulating film 13 and is covered with the alignment film AL1. That is, in the illustrated example, the first transparent electrode TE1 is disposed in the same layer as the pixel electrode PE. In addition, the first transparent electrode TE1 is formed of the same material as the pixel electrode PE. The insulating film 12 is not disposed in the optical function area OA. That is, the insulating films 11 and 13 are in contact with each other directly below the first transparent electrode TE1. The insulating films 11 and 13 each are a transparent inorganic insulating film of silicon oxide, silicon nitride or the like, for example. The insulating film 12 is a transparent organic insulating film. The alignment film AL1 is in contact with the liquid crystal layer LC.

The second substrate SUB2 comprises a second insulating substrate 20, insulating films 21 and 22, a second transparent electrode TE2, a color filter layer CF, a light-shielding layer BM and an alignment film AL2. The insulating film 21 overlaps the pixel electrode PE, and is disposed between the second insulating substrate 20 and the liquid crystal layer LC. The insulating film 22 is disposed between the insulating film 21 and the liquid crystal layer LC. The second transparent electrode TE2 overlaps the first transparent electrode TE1, and is disposed between the second insulating substrate 20 and the liquid crystal layer LC. The insulating film 21 comprises a concave portion 21C in which the second transparent electrode TE2 is disposed. The structure of the second substrate SUB2 will be more specifically described below.

The second insulating substrate 20 is a transparent substrate such as a glass substrate or a flexible resin substrate. In each pixel PX, the insulating film 21 is disposed below the second insulating substrate 20. In each pixel PX, the insulating film 22 is disposed between the insulating film 21 and the liquid crystal layer LC. Directly above the pixel electrode PE, the insulating film 21 has a thickness T21, and the insulating film 22 has a thickness T22. The thicknesses T21 and T22 correspond to a length along the third direction Z. The thickness T21 is greater than the thickness T22, and corresponds to, for example, greater than or equal to 10 times but less than or equal to 50 times the thickness T22. In one example, the thickness T21 is greater than or equal to 30 μm but less than or equal to 150 μm, more specifically, 50 μm to 100 μm. The insulating films 21 and 22 each are a transparent organic insulating film. The insulating film 22 is covered with the alignment film AL2. The alignment film AL2 is in contact with the liquid crystal layer LC.

The color filter layer CF and the light-shielding layer BM are disposed between the insulating films 21 and 22. Although not described in detail, the color filter layer CF comprises a red color filter disposed in a red pixel, a green color filter disposed in a green pixel, and a blue color filter disposed in a blue pixel. Each color filter is opposed to the pixel electrode PE. The light-shielding layer BM is disposed between the adjacent pixel electrodes PE or between the adjacent color filters.

In the optical function area OA, the insulating film 21 has a thickness less than the thickness T21, and forms the concave portion 21C. In the illustrated example, the insulating film 21 is penetrated in the concave portion 21C. The second transparent electrode TE2 is in contact with the second insulating substrate 20. In addition, in the illustrated example, the light-shielding layer BM, the color filter layer CF and the insulating film 22 are not disposed in the concave portion 21C. The alignment film AL2 directly covers the second transparent electrode TE2. The insulating film 21 has a side wall 21S in the concave portion 21C. The side wall 21S is formed substantially perpendicularly to the second insulating substrate 20. In addition, the length along the third direction Z of the side wall 21S is greater than or equal to the thickness T21. The alignment film AL2 is not disposed on the side wall 21S. That is, the alignment film AL2 breaks at the side wall 21S. It should be noted that the alignment film AL2 may cover a part of the side wall 21S. In addition, at least one of the insulating film 22, the color filter layer CF and the light-shielding layer BM may cover the side wall 21S.

As described above, since the insulating film 21 is not disposed in the optical function area OA, the thickness of the liquid crystal layer LC becomes greater in the optical function area OA than in the pixel PX. In addition, since the insulating film 22, the color filter layer CF and the light-shielding layer BM are not disposed in the second substrate SUB2 and the insulating film 12 is not disposed in the first substrate SUB, the liquid crystal layer LC in the optical function area OA is further expanded in the third direction Z.

In the non-display portion NDA, a light-shielding layer BMA is disposed between the insulating films 21 and 22.

The second transparent electrode TE2 is electrically connected to a connecting portion TEC disposed in the non-display portion NDA. In the illustrated example, the connecting portion TEC is formed integrally with the second transparent electrode TE2. However, the connecting portion TEC may be formed of a different conductive material from the second transparent electrode TE2.

In the illustrated example, the first polarizer PL1 and the second polarizer PL2 are disposed over each pixel PX and the optical function area OA.

In the pixel PX in an off state where voltage is not applied to the liquid crystal layer LC, liquid crystal molecules contained in the liquid crystal layer LC are initially aligned in a predetermined direction between the alignment films AL1 and AL2. In the off state, light guided from the light source EM shown in FIG. 1 to the pixel PX is absorbed by the first polarizer PL1 and the second polarizer PL2. Therefore, the liquid crystal element LCD displays black in the pixel PX in the off state.

In each pixel PX in an on state where voltage is applied to the liquid crystal layer LC, the liquid crystal molecules LM are aligned in a direction different from the initial alignment direction by an electric field formed between the pixel electrode PE and the common electrode CE, and the alignment direction is controlled by the electric field. In the on state, a part of the light guided to the pixel PX is transmitted through the first polarizer PL1 and the second polarizer PL2. Therefore, the liquid crystal element LCD displays a color corresponding to the color filter layer CF in the pixel PX in the on state.

The above example corresponds to what is called a normally black mode in which black is displayed in the off state. However, a normally white mode in which black is displayed in the on state (white is displayed in the off state) may be applied.

In the optical function area OA in the on state where voltage is applied to the liquid crystal layer LC, the liquid crystal element LCD forms a light-transmitting state in which light traveling toward the camera 1C is transmitted. The optical function area OA in the on state will be described later. In the optical function area OA in the off state where voltage is not applied to the liquid crystal layer LC, the liquid crystal element LCD may form a light-blocking state in which black is displayed as in the pixel PX in the off state, or may form a light-transmitting state as in the pixel PX in the on state. In addition, at least one of the first polarizer PL1 and the second polarizer PL2 may have a through hole overlapping the optical function area OA.

In the present embodiment, the insulating film 21 corresponds to the first organic insulating film, the insulating film 22 corresponds to the second organic insulating film, the insulating film 12 corresponds to the third organic insulating film, and the insulating film 13 corresponds to the inorganic insulating film.

FIG. 5 is a cross-sectional view showing a feeding structure for applying voltage to the second transparent electrode TE2. The first substrate SUB1 comprises a feeding line FL, and a feeding pad PD electrically connected to the feeding line FL. The feeding line FL is formed of the same material as the scanning line G or the signal line S, for example. The feeding pad PD is formed of the same material as the pixel electrode PE, for example. The feeding line FL and the feeding pad PD are disposed in the non-display portion NDA. The feeding pad PD is in contact with the feeding line FL in a through hole CH1 penetrating the insulating film 13. The feeding pad PD is exposed from the alignment film AL1. In the second substrate SUB2, the second transparent electrode TE2 comprises the connecting portion TEC overlapping the feeding pad PD.

A connecting member CD is disposed between the first substrate SUB1 and the second substrate SUB2, and is in contact with the feeding pad PD and the connecting portion TEC. Accordingly, the feeding pad PD and the connecting portion TEC are electrically connected to each other. This connecting member CD is, for example, conductive particles plated with gold or the like, and is contained in the sealant SE. That is, the feeding pad PD and the connecting portion TEC are arranged in an area in which the sealant SE is disposed, and are electrically connected to each other by the connecting member CD when the first substrate SUB1 and the second substrate SUB2 are bonded together.

According to the feeding structure, when a predetermined voltage is supplied to the feeding line FL, the predetermined voltage can be applied to the second transparent electrode TE2 via the feeding pad PD, the connecting member CD and the connecting portion TEC.

Figure 6:
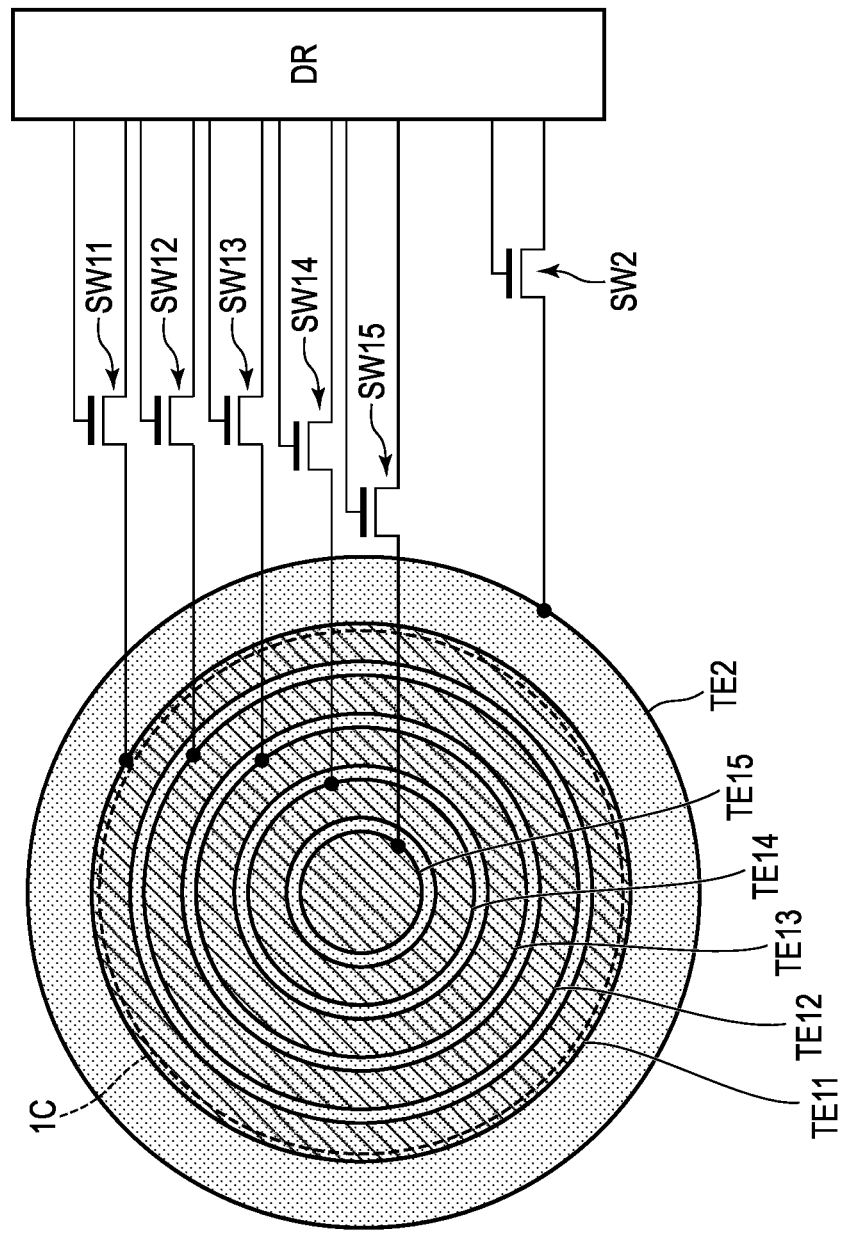
FIG. 6 is an illustration showing a shape example of a first transparent electrode TE1.

FIG. 6 is an illustration showing a shape example of the first transparent electrode TE1. In the illustrated example, five first transparent electrodes TE11 to TE15 are disposed. The first transparent electrodes TE11 to TE14 are formed in an annular shape, and the first transparent electrode TE15 is formed in a substantially circular shape. The second transparent electrode TE2 overlaps the first transparent electrodes TE11 to TE15 and also overlaps gaps between the adjacent first transparent electrodes in planar view, and is formed in a substantially circular shape. It should be noted that the first transparent electrodes TE11 to TE15 may be formed in a polygonal shape. In addition, the number of the first transparent electrodes is not limited to the number of the illustrated example, that is, five. The camera 1C overlaps the first transparent electrodes TE11 to TE15 as shown by a dotted line in the drawing.

The first transparent electrodes TE11 to TE15 are connected to a driver DR via switching elements SW11 to SW15, respectively. The second transparent electrode TE2 is connected to the driver DR via a switching element SW2. The driver DR can apply predetermined voltages to the first transparent electrodes TE11 to TE15 and the second transparent electrode TE2, respectively. It should be noted that the switching elements SW11 to SW15 and the switching element SW2 may be omitted. In that case, the driver DR may directly apply predetermined voltages to the first transparent electrodes TE11 to TE15 and the second transparent electrode TE2, respectively.

FIG. 7 is an illustration for explaining a control example for forming a lens (liquid crystal lens) LL in the liquid crystal layer LC of the optical function area OA. The driver DR applies voltage for forming the lens LL in the liquid crystal layer LC to the first transparent electrodes TE11 to TE15 and the second transparent electrode TE2. It is assumed that the liquid crystal layer LC has a positive dielectric anisotropy, and the liquid crystal molecules LM are initially aligned horizontally along the main surface of the substrate in the off state where voltage is not applied.

An example where the lens LL functions as an illustrated convex lens will be described below. As for the first transparent electrodes TE11 to TE15, a higher voltage is applied as the distance from an optical axis OX of the camera 10 increases. That is, the voltage applied to the first transparent electrode TE11 is higher than the voltage applied to the first transparent electrode TE15. In one example, a voltage of 5 V is applied to the first transparent electrode TE11, a voltage of 4 V is applied to the first transparent electrode TE12, a voltage of 3 V is applied to the first transparent electrode TE13, a voltage of 2 V is applied to the first transparent electrode TE14, and a voltage of 1 V is applied to the first transparent electrode TE15. On the other hand, for example, a voltage of 0 V is applied to the second transparent electrode TE2. In an area in which each of the first transparent electrodes TE11 to TE15 and the second transparent electrode TE2 are opposed to each other, a longitudinal electric field along the third direction Z or a lateral electric field along the main surface of the substrate is formed. The alignment direction of the liquid crystal molecules LM are controlled by the interaction of these electric fields. The liquid crystal molecules LM have a refractive index anisotropy Δn. Therefore, the liquid crystal layer LC has a refractive index distribution according to the alignment state of the liquid crystal molecules LM. Alternatively, the liquid crystal layer LC has a retardation distribution or a phase distribution represented by Δn·d where d is the thickness along the third direction Z of the liquid crystal layer LC. The illustrated lens LL is formed by the refractive index distribution, the retardation distribution or the phase distribution. The lens LL is formed isotropically about the optical axis OX.

Of light L10 traveling toward the camera 1C, linearly polarized light transmitted through the second polarizer PL2 is refracted by the lens LL and enters the camera 10. In the illustrated example, the first polarizer PL1 is not disposed between the camera 1C and the first substrate SUB1. That is, the lens LL mainly exerts a focusing effect on the light L10. In the first configuration example, since the concave portion 21C is formed in the insulating film 21 having a relatively large thickness, the thickness d of the liquid crystal layer LC can be expanded, and the margin of adjustable retardation can be expanded.

FIG. 8 is an illustration for explaining another control example for forming the lens LL in the liquid crystal layer LC of the optical function area OA. The control example described in FIG. 8 is different from the control example described in FIG. 7 in that the lens LL functions as an illustrated concave lens. As for the first transparent electrodes TE11 to TE15, a lower voltage is applied as the distance from the optical axis OX of the camera 1C increases. That is, the voltage applied to the first transparent electrode TE11 is lower than the voltage applied to the first transparent electrode TE15. In one example, a voltage of 1 V is applied to the first transparent electrode TE11, a voltage of 2 V is applied to the first transparent electrode TE12, a voltage of 3 V is applied to the first transparent electrode TE13, a voltage of 4 V is applied to the first transparent electrode TE14, and a voltage of 5 V is applied to the first transparent electrode TE15. On the other hand, for example, a voltage of 0 V is applied to the second transparent electrode TE2. The illustrated lens LL is formed by the refractive index distribution, the retardation distribution or the phase distribution of the liquid crystal layer LC. The lens LL is formed isotropically about the optical axis OX. The illustrated lens LL mainly exerts a dispersing effect on the light L10.

As described above, by controlling voltage which the driver DR applies to the first transparent electrodes TE11 to TE15 and the second transparent electrode TE2, various lenses LL can be formed in the liquid crystal layer LC. The example described above is when lens LL is formed isotropically about the optical axis OX. However, the driver DR can form the lens LL asymmetrically about the optical axis OX, and can control the focal point of the convex lens or the concave lens.

Figure 9:
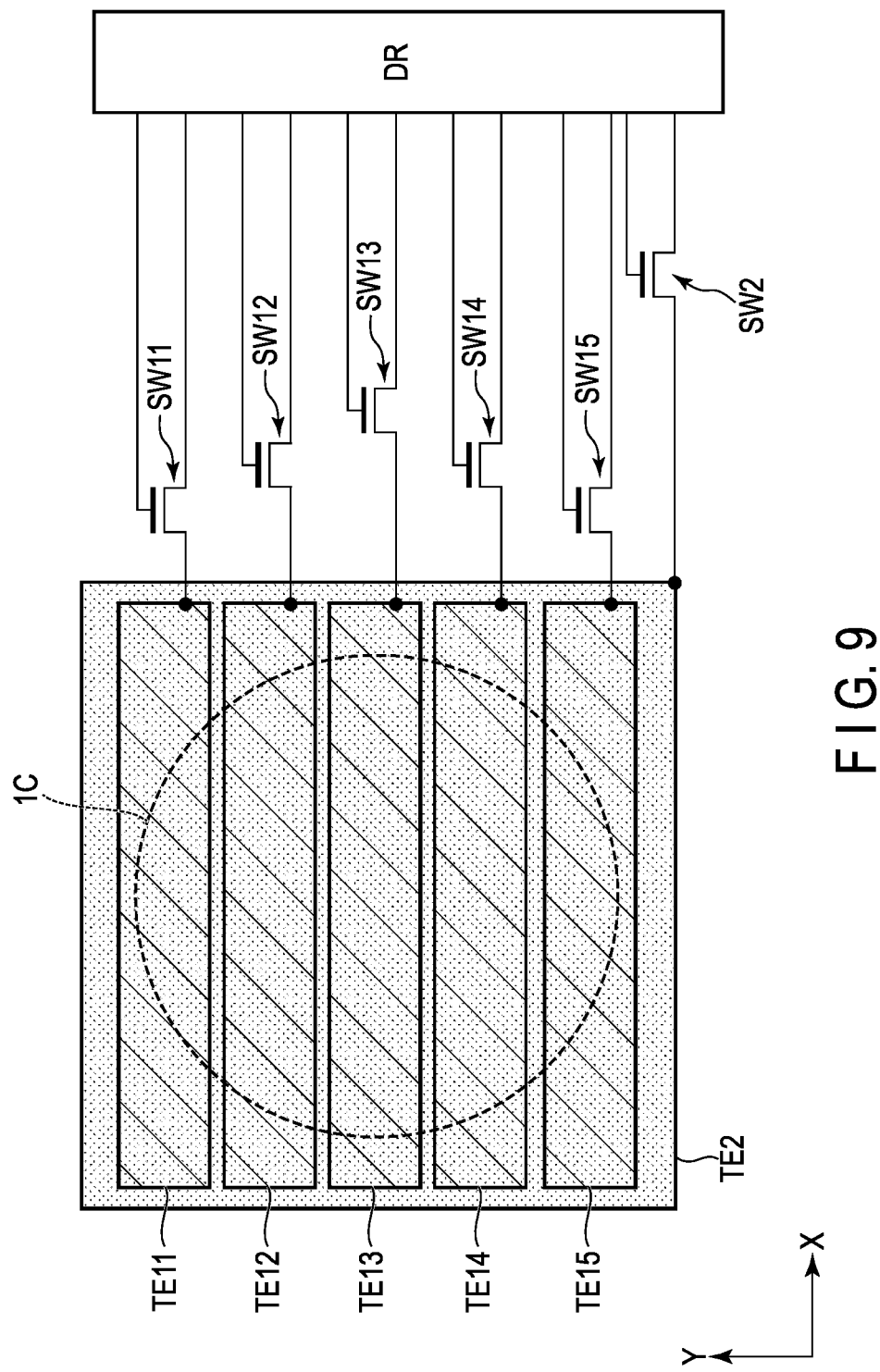
FIG. 9 is an illustration showing another shape example of the first transparent electrode TE1.

FIG. 9 is an illustration showing another shape example of the first transparent electrode TE1. The shape example shown in FIG. 9 is different from the shape example shown in FIG. 6 in that the first transparent electrodes TE11 to TE15 each are formed in a strip shape. In the illustrated example, the first transparent electrodes TE11 to TE15 extend in the first direction X and are arranged at intervals in the second direction Y. The second transparent electrode TE2 overlaps the first transparent electrodes TE11 to TE15 in planar view, and is formed in a substantially rectangular shape. It should be noted that the number of the first transparent electrodes is not limited to the number of the illustrated example, that is, five. In addition, the first transparent electrodes TE11 to TE15 may extend in the second direction Y, and may be arranged at intervals in the first direction X. The camera 1C overlaps the first transparent electrodes TE11 to TE15 as shown by a dotted line in the drawing.

The driver DR can apply predetermined voltages to the first transparent electrodes TE11 to TE15 via the switching elements SW11 to SW15, respectively. In addition, the driver DR can apply a predetermined voltage to the second transparent electrode TE2 via the switching element SW2. Also in this shape example, various lenses LL can be formed in the liquid crystal layer LC.

FIG. 10 is a cross-sectional view showing the second configuration example of the liquid crystal element LCD including the optical function area OA and the pixel PX. The second configuration example shown in FIG. 10 is different from the first configuration example shown in FIG. 4 in that the first transparent electrode TE1 is disposed on the insulating film 11. That is, in the first substrate SUB1, the first transparent electrode TE1 is disposed on the insulating film 11, and is covered with the insulating film 13. That is, in the illustrated example, the first transparent electrode TE1 is disposed in the same layer as the common electrode CE. In addition, the first transparent electrode TE1 is formed of the same material as the common electrode CE.

Also in the second configuration example, the same effect as that described above can be obtained.

FIG. 11 is a cross-sectional view showing the third configuration example of the liquid crystal element LCD including the optical function area OA and the pixel PX. The third configuration example shown in FIG. 11 is different from the first configuration example shown in FIG. 4 in that the second substrate SUB2 comprises the common electrode CE. That is, in the second substrate SUB2, the common electrode CE overlaps the pixel electrode PE, and is disposed between the insulating film 22 and the liquid crystal layer LC. In the illustrated example, the common electrode CE is disposed between the insulating film 22 and the alignment film AL2. The second transparent electrode TE2 can be formed in the same process as the common electrode CE, and is formed of the same material as the common electrode CE. In the illustrated example, the second transparent electrode TE2 is disposed between the second insulating substrate 20 and the alignment film AL2. In addition, the second transparent electrode TE2 is electrically connected to the connecting portion TEC. In the illustrated example, the connecting portion TEC is disposed between the second insulating substrate 20 and the insulating film 21 in the non-display portion NDA.

In the first substrate SUB1, a capacitive electrode 14 overlapping the pixel electrode PE is disposed. In the illustrated example, the capacitive electrode 14 is disposed on the insulating film 12, and is covered with the insulating film 13. This capacitive electrode 14 is electrically connected to, for example, the common electrode CE, and has the same potential as the common electrode CE.

Also in the third configuration example, the same effect as that described above can be obtained.

Other configuration examples will be described below. In each of the configuration examples described below, at least one of an area of the first insulating substrate 10 in which the first transparent electrode TE1 is disposed and an area of the second insulating substrate 20 in which the second transparent electrode TE2 is disposed comprises a concave portion.

Figure 12:
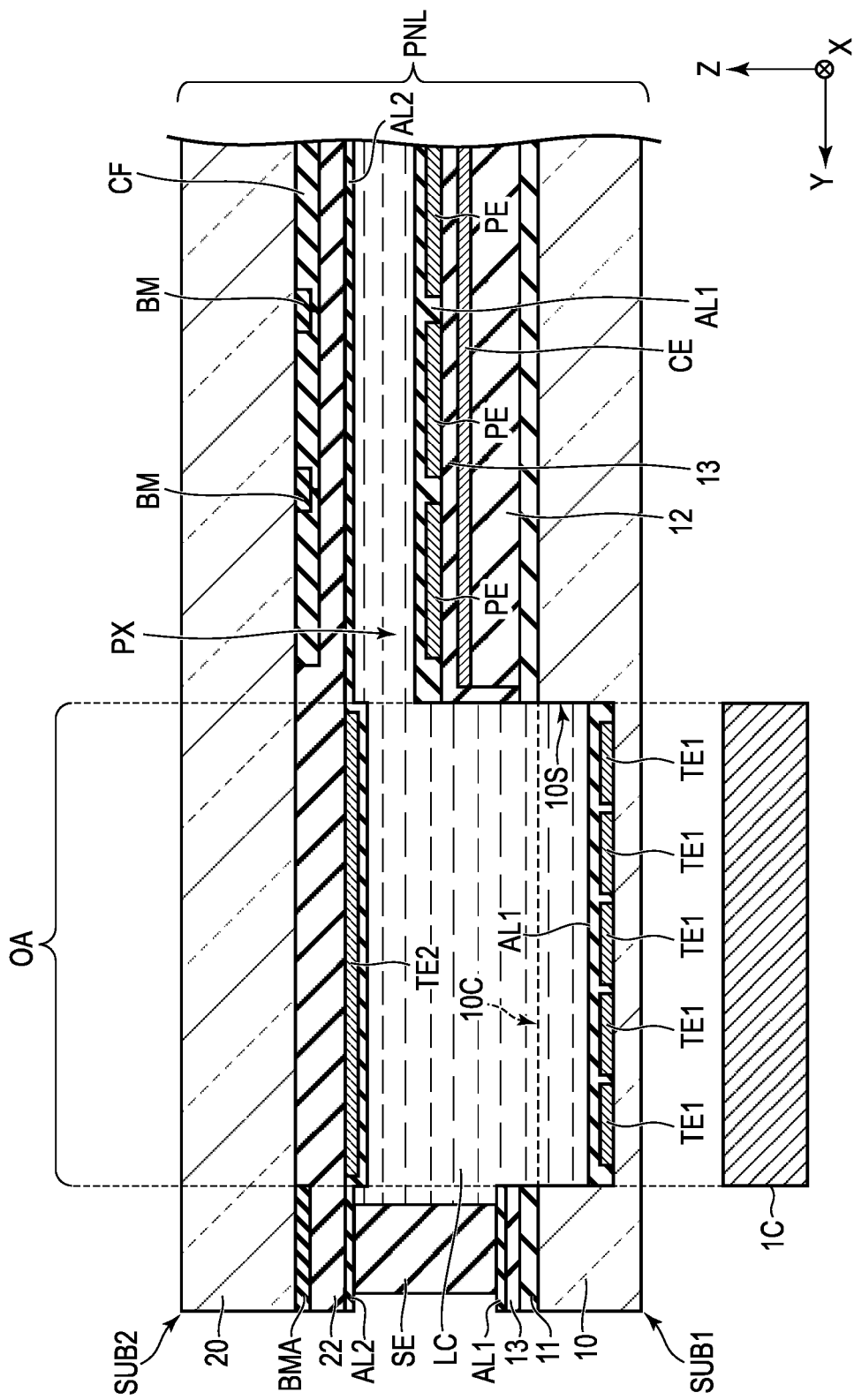
FIG. 12 is a cross-sectional view showing the fourth configuration example of the liquid crystal element LCD including the optical function area OA and the pixel PX.

FIG. 12 is a cross-sectional view showing the fourth configuration example of the liquid crystal element LCD including the optical function area OA and the pixel PX.

In the optical function area OA, the first insulating substrate 10 comprises a concave portion 10C on a side facing the liquid crystal layer LC (or on a side opposite to a side facing the camera 1C). The first transparent electrode TE1 is disposed in the concave portion 10C. In the illustrated example, the first transparent electrode TE1 is in contact with the first insulating substrate 10. In addition, the alignment film AL1 directly covers the first transparent electrode TE1. It should be noted that the insulating films 11 to 13 may be disposed between the first insulating substrate 10 and the first transparent electrode TE1. The first transparent electrode TE1 is formed of the same material as the pixel electrode PE in one example, but may be formed of the same material as the common electrode CE. The first insulating substrate 10 has a side wall 10S in the concave portion 10C. The alignment film AL1 is not disposed on the side wall 10S.

The second substrate SUB2 does not comprise the insulating film 21 described in the first to third configuration examples. The color filter layer CF and the light-shielding layers BM and BMA are disposed between the second insulating substrate 20 and the insulating film 22. In the optical function area OA, the second transparent electrode TE2 is disposed between the insulating film 22 and the alignment film AL2. The color filter layer CF and the light-shielding layers BM and BMA are not disposed between the second insulating substrate 20 and the second transparent electrode TE2.

As described above, since the concave portion 10C is provided in the first insulating substrate 10 in the optical function area OA, the thickness of the liquid crystal layer LC becomes greater in the optical function area OA than in the pixel PX. Therefore, the same effect as that obtained in the first configuration example can also be obtained in the fourth configuration example.

FIG. 13 is a cross-sectional view showing the fifth configuration example of the liquid crystal element LCD including the optical function area OA and the pixel PX.

In the optical function area OA, the second insulating substrate 20 comprises a concave portion 20C on a side facing the liquid crystal layer LC (or a side facing the camera 1C). The second transparent electrode TE2 is disposed in the concave portion 20C. In the illustrated example, the second transparent electrode TE2 is in contact with the second insulating substrate 20. In addition, the alignment film AL2 directly covers the second transparent electrode TE2. It should be noted that the insulating film 22 may be disposed between the second insulating substrate 20 and the second transparent electrode TE2. The second insulating substrate 20 has a side wall 20S in the concave portion 20C. The alignment film AL2 is not disposed on the side wall 20S.

As described above, since the concave portion 20C is provided in the second insulating substrate 20 in the optical function area OA, the thickness of the liquid crystal layer LC becomes greater in the optical function area OA than in the pixel PX. Therefore, the same effect as that obtained in the first configuration example can also be obtained in the fifth configuration example.

FIG. 14 is a cross-sectional view showing the sixth configuration example of the liquid crystal element LCD including the optical function area OA and the pixel PX.

In the optical function area OA, the first insulating substrate 10 comprises the concave portion 10C as in the fourth configuration example. The first transparent electrode TE1 is disposed in the concave portion 10C. In addition, the second insulating substrate 20 comprises the concave portion 20C as in the fifth configuration example. The second transparent electrode TE2 is disposed in the concave portion 20C.

As described above, in the optical function area OA, the concave portion 10C is provided in the first insulating substrate 10, and the concave portion 20C is provided in the second insulating substrate 20. Therefore, the thickness of the liquid crystal layer LC is greater in the optical function area OA than in the pixel PX. Consequently, according to the sixth configuration, the thickness d of the liquid crystal layer LC can be expanded even further than the fourth and fifth configuration examples, and the margin of adjustable retardation can be expanded even further.

As described above, according to the present embodiment, a display device capable of expanding a display portion, and an electronic apparatus incorporating the display device therein can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a liquid crystal layer;
   a first substrate comprising a first insulating substrate, a pixel electrode disposed between the first insulating substrate and the liquid crystal layer, and a first transparent electrode disposed between the first insulating substrate and the liquid crystal layer; and
   a second substrate comprising a second insulating substrate, a first organic insulating film overlapping the pixel electrode and disposed between the second insulating substrate and the liquid crystal layer, a second organic insulating film disposed between the first organic insulating film and the liquid crystal layer, and a second transparent electrode overlapping the first transparent electrode and disposed between the second insulating substrate and the liquid crystal layer, wherein
   the first organic insulating film comprises a concave portion, and
   the second transparent electrode is disposed in the concave portion.

2. The display device of claim 1, wherein the first organic insulating film has a thickness of greater than or equal to 30 μm but less than or equal to 150 μm.

3. The display device of claim 1, wherein
   the first organic insulating film is penetrated to the second insulating substrate in the concave portion, and the second transparent electrode is in contact with the second insulating substrate.

4. The display device of claim 1, wherein
the second substrate further comprises an alignment film covering the second organic insulating film and the second transparent electrode,
the first organic insulating film has a side wall in the concave portion, and
the alignment film is not disposed on the side wall.

5. The display device of claim 1, wherein
the second substrate further comprises a color filter layer and a light-shielding layer disposed between the first organic insulating film and the second organic insulating film, and
the color filter layer and the light-shielding layer are not disposed in the concave portion.

6. The display device of claim 1, wherein
the first substrate further comprises a third organic insulating film disposed between the first insulating substrate and the pixel electrode, and
the third organic insulating film is not disposed between the first insulating substrate and the first transparent electrode.

7. The display device of claim 1, wherein
the first substrate further comprises a common electrode, and an inorganic insulating film disposed between the pixel electrode and the common electrode, and
the first transparent electrode is formed of a same material as the pixel electrode or the common electrode.

8. The display device of claim 1, wherein
the second substrate further comprises a common electrode overlapping the pixel electrode and disposed between the second organic insulating film and the liquid crystal layer, and
the second transparent electrode is formed of a same material as the common electrode.

9. The display device of claim 1, further comprising a connecting member disposed between the first substrate and the second substrate, wherein
the first substrate further comprises a feeding pad,
the second transparent electrode comprises a connecting portion overlapping the feeding pad, and
the connecting member electrically connects the feeding pad and the connecting portion to each other.

10. The display device of claim 1, wherein the first transparent electrode is formed in an annular shape.

11. The display device of claim 1, wherein the first transparent electrode is formed in a strip shape.

12. An electronic apparatus comprising:
a liquid crystal panel comprising a liquid crystal layer; and
a camera overlapping the liquid crystal panel, and receiving light via the liquid crystal panel, wherein
the liquid crystal panel comprises:
a first substrate comprising a first insulating substrate, a pixel electrode disposed between the first insulating substrate and the liquid crystal layer, and a first transparent electrode overlapping the camera and disposed between the first insulating substrate and the liquid crystal layer; and
a second substrate comprising a second insulating substrate, a first organic insulating film overlapping the pixel electrode and disposed between the second insulating substrate and the liquid crystal layer, a second organic insulating film disposed between the first organic insulating film and the liquid crystal layer, and a second transparent electrode overlapping the first transparent electrode and disposed between the second insulating substrate and the liquid crystal layer,
the first organic insulating film comprises a concave portion overlapping the camera, and
the second transparent electrode is disposed in the concave portion.

13. The electronic apparatus of claim 12, further comprising an illumination device illuminating the liquid crystal panel, wherein
the illumination device has an opening, and
the camera is disposed in the opening.

14. The electronic apparatus of claim 12, wherein a thickness of the first organic insulating film is greater than or equal to 10 times but less than or equal to 50 times a thickness of the second organic insulating film.

15. The electronic apparatus of claim 12, wherein
the first organic insulating film is penetrated to the second insulating substrate in an area overlapping the camera, and
the second transparent electrode is in contact with the second insulating substrate.

16. The electronic apparatus of claim 12, wherein
the second substrate further comprises a color filter layer and a light-shielding layer disposed between the first organic insulating film and the second organic insulating film, and
the color filter layer and the light-shielding layer are not disposed in an area overlapping the camera.

17. The electronic apparatus of claim 12, wherein
a plurality of the first transparent electrodes are formed in an annular shape in an area overlapping the camera, and
the second transparent electrode overlaps the first transparent electrodes, and is formed in a circular shape.

18. The electronic apparatus of claim 12, wherein
a plurality of the first transparent electrodes are formed in a strip shape in an area overlapping the camera, and
the second transparent electrode overlaps the first transparent electrodes, and is formed in a polygonal shape.

* * * * *